(12) United States Patent
Kagan

(10) Patent No.: US 10,397,178 B2
(45) Date of Patent: *Aug. 27, 2019

(54) INTERNET INFRASTRUCTURE SURVEY

(71) Applicant: Cedexis, Inc., Portland, OR (US)

(72) Inventor: Martin Kagan, Portland, OR (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 229 days.

This patent is subject to a terminal disclaimer.

(21) Appl. No.: 15/199,592

(22) Filed: Jun. 30, 2016

(65) Prior Publication Data

US 2017/0034119 A1   Feb. 2, 2017

Related U.S. Application Data

(63) Continuation of application No. 13/502,106, filed as application No. PCT/US2010/055145 on Nov. 2, 2010, now Pat. No. 9,385,988.

(60) Provisional application No. 61/258,042, filed on Nov. 4, 2009.

(51) Int. Cl.
| | |
|---|---|
| *G06F 15/173* | (2006.01) |
| *H04L 29/12* | (2006.01) |
| *G06F 16/951* | (2019.01) |
| *H04L 29/08* | (2006.01) |
| *H04L 12/851* | (2013.01) |

(52) U.S. Cl.
CPC ........ *H04L 61/1511* (2013.01); *G06F 16/951* (2019.01); *H04L 47/24* (2013.01); *H04L 61/302* (2013.01); *H04L 61/305* (2013.01); *H04L 61/6009* (2013.01); *H04L 67/30* (2013.01)

(58) Field of Classification Search
CPC ... H04L 61/1511; H04L 47/822; G06F 21/316
See application file for complete search history.

(56) References Cited

U.S. PATENT DOCUMENTS

| | | | |
|---|---|---|---|
| 5,716,422 | A | 2/1998 | Muffoletto et al. |
| 6,006,260 | A | 12/1999 | Barrick, Jr. et al. |
| 6,014,660 | A | 1/2000 | Lim et al. |
| 6,330,590 | B1 | 12/2001 | Cotten |

(Continued)

FOREIGN PATENT DOCUMENTS

| | | |
|---|---|---|
| WO | WO 2000/14940 | 3/2000 |
| WO | WO 2011/46790 | 4/2011 |

OTHER PUBLICATIONS

International Search Report dated Jan. 10, 2011, from International Patent Application No. PCT/US2010/055145.

(Continued)

*Primary Examiner* — Mohamed Ibrahim
(74) *Attorney, Agent, or Firm* — Klarquist Sparkman, LLP

(57) ABSTRACT

A system for surveying Internet access quality includes a nameserver, registered to be authoritative for a domain name and configured to receive a DNS query to resolve a pseudo-hostname and to extract from the pseudo-hostname an access quality indicator, and a web portal configured to transmit a data survey code to a web browser, the data survey code being configured to access a resource, to determine the access quality indicator responsively to the resource access, to generate the pseudo-hostname including the access quality indicator and the domain name, and to initiate the DNS query.

21 Claims, 2 Drawing Sheets

(56) References Cited

U.S. PATENT DOCUMENTS

| | | |
|---|---|---|
| 6,446,121 B1 | 9/2002 | Shah et al. |
| 6,981,180 B1 | 12/2005 | Bailey et al. |
| 6,996,616 B1 | 2/2006 | Leighton et al. |
| 7,003,555 B1 | 2/2006 | Jungck |
| 7,152,105 B2 | 12/2006 | McClure et al. |
| 7,155,723 B2 | 12/2006 | Swildens et al. |
| 7,525,921 B1 | 4/2009 | Yi Dar Lo |
| 7,574,499 B1 | 8/2009 | Swildens et al. |
| 7,580,356 B1 | 8/2009 | Mishra et al. |
| 7,594,029 B2 | 9/2009 | Fujita et al. |
| 7,596,619 B2 | 9/2009 | Leighton et al. |
| 7,680,276 B2 | 3/2010 | Steinberg |
| 7,725,602 B2 | 5/2010 | Liu et al. |
| 7,840,699 B2 | 11/2010 | Fujita et al. |
| 7,860,964 B2 | 12/2010 | Brady et al. |
| 7,912,978 B2 | 3/2011 | Swildens et al. |
| 7,962,582 B2 | 6/2011 | Potti et al. |
| 8,122,102 B2 | 2/2012 | Wein et al. |
| 8,447,837 B2 | 5/2013 | Devanneaux et al. |
| 8,601,160 B1* | 12/2013 | Sargent ............... H04L 51/12 709/203 |
| 8,732,309 B1 | 5/2014 | Richardson et al. |
| 8,756,341 B1 | 6/2014 | Richardson et al. |
| 9,301,155 B2* | 3/2016 | Caldwell ............... H04L 45/745 |
| 9,385,988 B2 | 7/2016 | Kagan |
| 2001/0039585 A1* | 11/2001 | Primak ............. H04L 29/12066 709/228 |
| 2001/0049741 A1 | 12/2001 | Skene et al. |
| 2002/0026525 A1* | 2/2002 | Armitage ............ H04L 12/185 709/238 |
| 2002/0052942 A1 | 5/2002 | Swildens et al. |
| 2002/0078233 A1 | 6/2002 | Biliris et al. |
| 2002/0120727 A1 | 8/2002 | Curley et al. |
| 2002/0133575 A1 | 9/2002 | Cidon et al. |
| 2002/0174358 A1 | 11/2002 | Wolff et al. |
| 2003/0017104 A1 | 1/2003 | Spitler et al. |
| 2003/0088671 A1 | 5/2003 | Klinker et al. |
| 2004/0068582 A1 | 4/2004 | Anderson et al. |
| 2004/0073691 A1 | 4/2004 | Sun |
| 2004/0073707 A1 | 4/2004 | Dillon |
| 2004/0153545 A1 | 8/2004 | Pandya et al. |
| 2004/0179689 A1 | 9/2004 | Maggenti et al. |
| 2004/0215707 A1 | 10/2004 | Fujita et al. |
| 2004/0215977 A1 | 10/2004 | Goodman et al. |
| 2005/0076139 A1* | 4/2005 | Jinmei ............. H04L 29/12066 709/245 |
| 2005/0091378 A1 | 4/2005 | Nonnenmacher |
| 2005/0097179 A1 | 5/2005 | Orme |
| 2005/0193073 A1 | 9/2005 | Mehr et al. |
| 2005/0286564 A1 | 12/2005 | Hatley et al. |
| 2006/0031319 A1 | 2/2006 | Nelson et al. |
| 2006/0075139 A1 | 4/2006 | Jungck |
| 2006/0112176 A1 | 5/2006 | Liu et al. |
| 2006/0129672 A1 | 6/2006 | Mayer |
| 2006/0218644 A1 | 9/2006 | Niles et al. |
| 2006/0251043 A1* | 11/2006 | Madour ............... H04L 47/2425 370/349 |
| 2007/0005689 A1 | 1/2007 | Leighton et al. |
| 2007/0033645 A1 | 2/2007 | Jones |
| 2007/0043863 A1 | 2/2007 | Schlesener et al. |
| 2007/0174402 A1 | 7/2007 | Tomkow |
| 2007/0210528 A1 | 9/2007 | Baber |
| 2007/0214283 A1 | 9/2007 | Metke et al. |
| 2008/0046970 A1 | 2/2008 | Oliver et al. |
| 2008/0065745 A1 | 3/2008 | Leighton et al. |
| 2008/0168536 A1 | 7/2008 | Rueckwald |
| 2008/0222243 A1 | 9/2008 | Shaw |
| 2008/0293404 A1* | 11/2008 | Scherzer ............... H04W 84/18 455/426.1 |
| 2008/0307057 A1 | 12/2008 | Prentiss, Jr. |
| 2009/0083413 A1 | 3/2009 | Levow et al. |
| 2009/0187654 A1 | 7/2009 | Raja et al. |
| 2009/0210528 A1 | 8/2009 | Swildens et al. |
| 2009/0246636 A1 | 10/2009 | Chiang et al. |
| 2009/0327517 A1 | 12/2009 | Sivasubramanian et al. |
| 2010/0005191 A1* | 1/2010 | Drako ................. H04L 61/1511 709/238 |
| 2010/0088405 A1 | 4/2010 | Huang et al. |
| 2010/0098055 A1 | 4/2010 | Kutt et al. |
| 2010/0125673 A1 | 5/2010 | Richardson et al. |
| 2010/0161787 A1 | 6/2010 | Jones |
| 2010/0269174 A1 | 10/2010 | Shelest |
| 2010/0290337 A1 | 11/2010 | Suvi et al. |
| 2010/0293296 A1 | 11/2010 | Hsu et al. |
| 2010/0296453 A1* | 11/2010 | Grahn ............... H04L 29/12066 370/328 |
| 2013/0232274 A1* | 9/2013 | Johansson ............. H04L 67/141 709/228 |

OTHER PUBLICATIONS

International Search Report dated Nov. 26, 2010, from International Patent Application No. PCT/US2010/051720.

Mao et al., "A Precise and Efficient Evaluation of the Proximity Between Web Clients and Their Local DNS Servers," *USENIX Annual Technical Conf.*, General Track (2002).

Mockapetris, "Domain names—implementation and specification," STD 13, RFC 1035 (Nov. 1987).

Office action dated May 27, 2014, from Chinese Patent Application No. 201080049987.6, 17 pp.

Olston et al., "Adaptive Filters for Continuous Queries over Distributed Data Streams," *SIGMOD*, pp. 563-574 (Jun. 2003).

Supplemental European Search Report dated May 10, 2013, from European Patent Application No. 10823851.0, 5 pp.

"Web cache," retrieved from https://web.archive.org/web/20090423073117/http://en.wikipedia.org/wiki/Web_cache on Aug. 26, 2014.

"Web Caching—A cost effective approach for organizations to address all types of bandwidth management challenges," retrieved from https://web.archive.org/web/20100821115801/http://www.visolve.com/squid/whitepapers/ViSolve_Web_Caching.pdf on Aug. 26, 2014 (Mar. 2009).

Written Opinion dated Nov. 26, 2010, from International Patent Application No. PCT/US2010/051720.

* cited by examiner

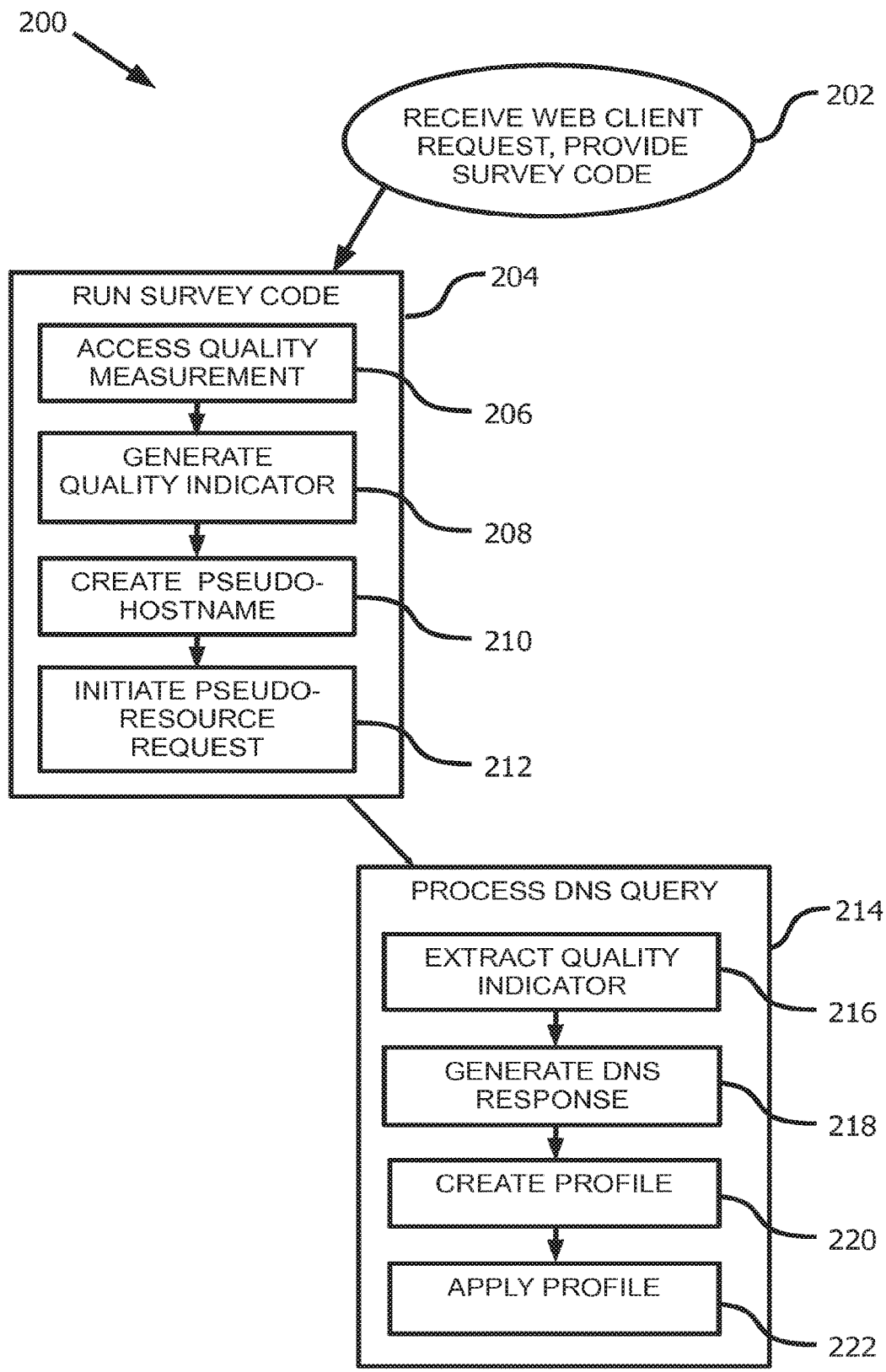

INTERNET INFRASTRUCTURE SURVEY

RELATED APPLICATION DATA

This application is a continuation of U.S. patent application Ser. No. 13/502,106, filed 30 May 2012, entitled "Internet Infrastructure Survey," which is the U.S. National Stage of International Application No. PCT/US2010/055145, filed 2 Nov. 2010, entitled, "Internet Infrastructure Survey," which claims benefit of U.S. provisional patent application 61/258,042, filed 4 Nov. 2009, entitled "Resource Infrastructure Data Survey," all of which are incorporated herein by reference in their entirety.

FIELD OF THE INVENTION

The present invention relates generally to data communications and specifically to methods, systems, and computer program products for accessing computer resources.

BACKGROUND

Web clients, such as web browsers operating on personal computers or on mobile computing devices, access a wide range of Internet resources (hereinbelow, "resources"), which may include files, web pages, applications, and mail servers, as well as access services, including gateways for voice and other media. Resources are generally maintained within infrastructures, which may include corporate data centers, cloud computing infrastructures, and Content Delivery Networks (CDNs).

To access a resource over the Internet, a web client must issue a request including an Internet Protocol (IP) address. To obtain the IP address, the web client generally initiates a Domain Name System (DNS) query for a resolution of a Fully-Qualified Domain Name (FQDN), such as www.example.com. DNS resolution is described in publication RFC 1035 of the Internet Engineering Task Force (IETF) entitled, "DOMAIN NAMES IMPLEMENTATION AND SPECIFICATION", as well as in additional IETF publications related to DNS including RFCs 1033, 1034, 1912, 2181, 2136, 2535, and 4033, the teachings of which are all incorporated herein by reference. Generally, an authoritative nameserver is registered for a domain name (e.g., example.com), such that the authoritative nameserver receives DNS queries for the resolution of FQDNs that are subdomains of that domain name.

DNS queries may be made by web clients for reasons other than seeking FQDN resolution. IETF RFC 5782, the teachings of which are enclosed herein by reference, describes a protocol for DNS Blacklist (DNSBL), by which a DNS query is initiated by a mail server to check whether a mail sender is on a blacklist. The query includes an FQDN with two parts. One part is a domain name, by which the query is routed to an authoritative nameserver, and the other part is an IP address of the mail sender (in reverse octal form). The authoritative nameserver returns a response indicating whether or not the mail sender is blacklisted.

U.S. Patent Application Publication Number 2009/0083413 to Levow, et al., whose disclosure is incorporated herein by reference, describes a method for measuring a frequency of a data block appearing in email. A high frequency may indicate that a data block is spam or malware. An algorithm generates a hash code of the data block. The hash code is included in an FQDN, which is delivered in a DNS query to a nameserver.

U.S. Pat. No. 6,006,260 to Barrick, Jr., et al., whose disclosure is incorporated herein by reference, describes gathering information relating to a loading time experienced by a user of information over a network. A browser agent is sent to a user machine in response to a user request to access a Web page. The browser agent measures a download time interval and sends a modified HTTP GET request containing a performance parameter.

U.S. Patent Application 2010/0161787 to Jones, whose disclosure is incorporated herein by reference, describes a device requesting, via a browser application, content corresponding to a selected web page URL, parsing a packet capture to extract various statistics, and storing the statistics to output files.

SUMMARY

Embodiments of the present invention provide systems and methods for surveying access quality encountered by a web client when accessing a resource at a given infrastructure (hereinbelow, "Internet access quality," or simply, "access quality"). A survey result may subsequently be applied to applications that may include the determination of an access route, the pricing of access, and the maintenance of Quality of Service (QoS) commitments.

There is therefore provided, in accordance with an embodiment of the present invention, a method for surveying access quality including receiving at a DNS nameserver a DNS query for the resolution of a pseudo-hostname. The pseudo-hostname includes an access quality indicator, and the method includes extracting the access quality indicator from the pseudo-hostname. Some embodiments may further include generating an access quality profile responsively to the access quality indicator, and conveying the access quality profile to a requester. Typically, the access quality profile is specific to an infrastructure, and may also be specific to a client region, which may be a network or geographic region. The access quality profile may be generated by receiving at the nameserver one or more additional DNS queries providing one or more additional respective indicators of access quality, and calculating an average, or difference, or time-weighted average of the multiple received indicators. Some embodiments may also include determining a preferred Internet access route responsively to the profile. The determination of the Internet access route generally includes determining an infrastructure at which a web client accesses a resource.

Generally, the DNS nameserver is registered to be authoritative for a domain name included in the pseudo-hostname, whereby the DNS query is routed to the DNS nameserver. Typically, the access quality indicated by the access quality indicator is one of a set of access quality types including: a round trip time of Internet communication, a connection delay time, a transmission speed, a variability of transmission speed, a communications error rate, and an availability of a resource.

There is also provided, in accordance with further embodiments of the present invention, a method for surveying Internet access quality including transmitting a code to a web client, wherein the code is configured to execute at the web client to determine an access quality indicator, to create a pseudo-hostname including the access quality indicator and a domain name, and to initiate a DNS query to resolve the pseudo-hostname. The code may be configured to determine the access quality indicator by issuing a request for a resource and measuring a type of access quality with respect to a response. The type of access quality measured is typically one of a set of types of access quality including: a round trip time of Internet communication, a connection delay time, a transmission speed, a variability of transmission speed, a communications error rate, and an availability of a resource. Generally the resource is configured at an infrastructure to be accessible to the web client. The test resource may be accessed from a cache at the infrastructure and the code configured to issue the request for the test resource by issuing two requests for the test resource and adding a randomly generated resource parameter to each request.

The code may be configured to initiate the DNS query by requesting a resource at an address specified by the pseudo-hostname. In some embodiments, the web client is a web browser and the code is configured to run within the web browser in a manner that is transparent to a user of the web browser. In some embodiments, the code is configured to round the access quality indicator to a lower precision such that the DNS request to resolve the pseudo-hostname may be resolved by a resolver.

There is further provided, in accordance with an embodiment of the present invention, a method for surveying Internet access quality including issuing a request for a resource, generating an access quality indicator responsively to the request, creating a pseudo-hostname including the access quality indicator, and initiating a DNS query to resolve the pseudo-hostname.

There is also provided, in accordance with an embodiment of the present invention, a system for surveying Internet access quality including a web portal configured to transmit a data survey code to a web browser, wherein the data survey code is configured to run within the web browser to perform the steps of accessing a resource, of determining, responsively to the resource access, an access quality indicator, of generating a pseudo-hostname including the access quality indicator and a domain name, and of initiating a DNS query to resolve the pseudo-hostname; and a nameserver, registered to be authoritative for the domain name and configured to receive the DNS query and to extract from the pseudo-hostname the access quality indicator.

The present invention may be more fully understood from the following detailed description of the embodiments thereof, taken together with the drawings in which:

BRIEF DESCRIPTION OF THE DRAWINGS

FIG. 2 is a flow diagram of a method for surveying access quality, according to an embodiment of the present invention.

DETAILED DESCRIPTION

Figure 1:
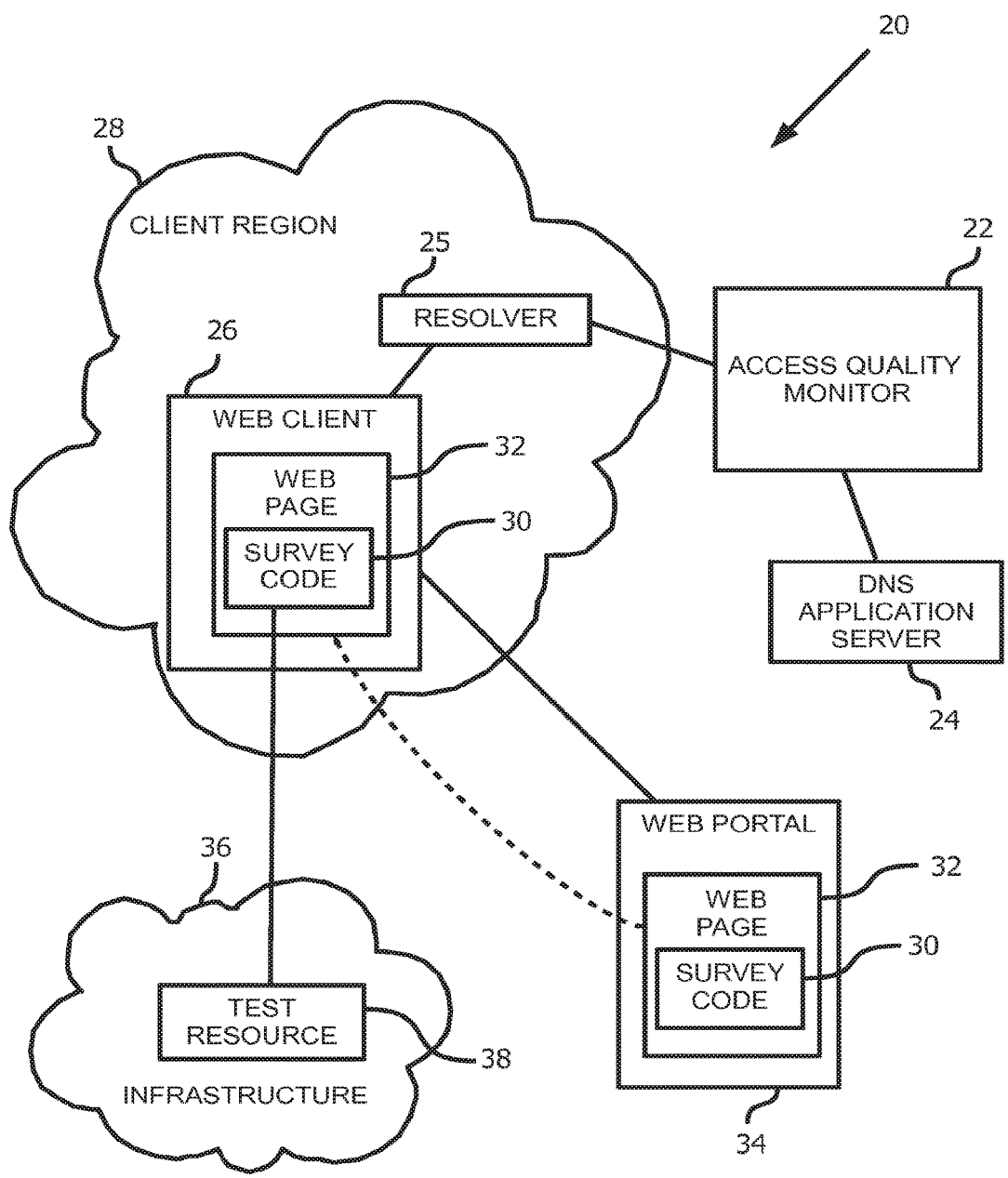
FIG. 1 is an illustrative schematic diagram of a system for surveying access quality, according to an embodiment of the present invention.

FIG. 1 is an illustrative schematic diagram of a system 20 including an Access Quality Monitor (AQM) 22, according to one embodiment. AQM 22 is a DNS nameserver registered as authoritative for a domain, such as aqm.net. The AQM is configured to process DNS queries, in particular DNS queries to resolve Fully Qualified Domain Names (FQDNs) that encode indicators of access quality.

Hereinbelow, an FQDN that encodes an access quality indicator is referred to as a pseudo-hostname. A pseudo-hostname generally includes two parts. One part is a domain name for which an AQM, such as AQM 22, is authoritative (i.e., the domain name aqm.net in the given scenario). The other part of the pseudo-hostname is a key string including an access quality indicator. For the sake of illustration, an access quality indicator may have a value of 2314, which may represent a communication delay of 231.4 ms. A pseudo-hostname encoded with the indicator may be 2314.aqm.net. Additional information may be included in the key string, such as identifiers of the infrastructure and resource that were accessed, as well as the type of access quality that was measured. As described hereinabove, an exemplary pseudo-hostname including the "rtt" access quality type would be rtt.2314.aqm.net.

Pseudo-hostnames are generated to conform to FQDN specifications, such as a length limit of 255 bytes, as specified in IETF RFC 2181. The AQM is configured such that upon receiving a DNS query to resolve a pseudo-hostname, the indicator of access quality is extracted and processed, as described further hereinbelow. Because the access quality indicator is received within a DNS query, the communication of the indicator avoids the time delay required for IP resolution in many typical forms of Internet client/server communications. Furthermore, some of the load of communications may be advantageously reduced due to resolver caching as described further hereinbelow.

The AQM may also implement functions of a Data Survey Server, as disclosed in PCT Application Number US10/51720 (PCT US10/51720), which is assigned to the inventor of the present invention, and which is incorporated herein by reference in its entirety. PCT US10/51720 discloses a Data Survey Server that communicates access quality data to a DNS Application Server, shown in FIG. 1 as DNS Application Server 24. Data may be communicated by the AQM as a continuous, synchronous or asynchronous data stream, or may be communicated on demand, that is, when requested by the DNS Application Server or another data requester. The DNS Application Server directs access by web clients to infrastructures based on access quality data. Alternatively or additionally, the AQM may implement functions of the DNS Application Server, including the function of directing access.

In an illustrative scenario, AQM 22 receives a DNS query including a pseudo-hostname from a resolver 25, the DNS query having been initiated by a web client 26. Web client 26 may be a web browser, such as Microsoft Internet Explorer or Google Chrome, that supports dynamically executable code, such as JavaScript. The DNS query is generally transmitted by means of a User Datagram Protocol (UDP), but may also be transmitted by Transmission Control Protocol (TCP). Transmitted messages generally include an IP address of the resolver. In some embodiments, the AQM may be configured to correlate the resolver address to a client region 28. Client region 28 may be an TP network, such as an Autonomous System (AS), as described in IETF RFC 1930, which is often a network managed by an Internet Service Provider (ISP). Alternatively or additionally, the correlation of a client region may be to a geographic region, such as a city, country, or continent.

In embodiments of the present invention, web client 26 executes a survey code 30, which generates the DNS query including the pseudo-hostname. Typically, survey code 30 is a form of Dynamic HTML (DHTML) code that executes within a web page 32.

In general, web page 32 provides a service or includes content that is unrelated to the operation of the survey code, and the survey code is configured to run within the web client in parallel with the execution of the web page service or content. The execution of the survey code is generally transparent to a user of the web client.

The web client may receive the web page from a web portal 34. Web portal 34 is understood to be a system of software and hardware configured to provide resources requested by means of Hypertext Transfer Protocol (HTTP) or by other Internet access protocols, such as file transfer and streaming media protocols. Resources accessible from the web portal may be physically maintained within one or more Internet infrastructures, including an infrastructure 36.

The survey code is configured with instructions for determining a measure of access quality associated with accessing a resource such as a test resource 38 at infrastructure 36. Test resource 38 may be any type of Internet resource that when accessed returns a message or other form of content to the web client. In one embodiment, the test resource may be a JavaScript code. Examples of the survey code, encoded in JavaScript, and the test resource, also a JavaScript code, are shown in the Appendix.

In an illustrative scenario, the measure of access quality may be a time delay associated with accessing the test resource. A time delay may include one or more of the following: a response, or "round-trip" time (an elapsed time between sending a transmission requesting a resource and receiving a response); a connect time (such as a time to make an IP connection, an SSL connection, or a connection to a transaction application server); and a time between transmission bytes (i.e., a speed of transmission, typically measured in bytes/sec).

Because some infrastructures, particularly CDNs, cache resources from primary, or "origin" sources, a further measure of access quality may be a measure of a time delay of a second access of the test resource, thereby measuring access quality when the test resource is in a CDN cache.

Additional measures of access quality may be an error or data corruption rate (such as percent of bad bytes or bad packets, or rate of packet loss), a connection variability or jitter (such as variability of transmission speed or error rate), and a measure of availability (an indicator of whether or not a connection or service was completed).

The survey code may be configured to measure different aspects of access quality when accessing different types of resources. For example, transmission time and jitter may be measured for relatively large files, such as files greater than ten kilobytes, whereas measures of availability and connect time may be measured when accessing resources that provide short response messages. Jitter may be especially relevant for an audio or video streaming resource.

Access quality encountered by the web client when accessing the test resource at the infrastructure is generally similar to access quality encountered by other web clients in the client region, to the extent that the access quality is a function of network and infrastructure performance. A profile of access quality generated by the AQM, described further hereinbelow, generally represents access quality from a region to a given infrastructure.

FIG. 2 is a flow diagram of a method 200 for surveying access quality, according to an embodiment of the present invention.

At an initial step 202, web portal 34 receives from web client 26 a request for web page 32. The web page requested includes survey code 30 as described above. The survey code may be added to the web page by the provider of the page (the "resource provider"). In response to the request from the web client, the web portal delivers to the web client the web page including the survey code.

In some embodiments, a stub code added to the web page directs the web client to retrieve the survey code from a different web location, such as a location managed by an operator of the AQM. The survey code may also be divided into several code sections, each received separately by the web client. In alternative embodiments, the web client may be configured to initially include the survey code.

At a step 204, the web client executes the survey code, an operation that includes steps 206-212. The survey code typically begins to execute as soon as the web page is loaded to the web client. As indicated in the exemplary survey code shown in the Appendix, the survey code may be configured to make access quality measurements at multiple infrastructures. In the exemplary code, one infrastructure from among the multiple options is selected as the infrastructure at which to access the test resource.

At a step 206, the survey code makes an access quality measurement, an operation that includes requesting test resource 38 and making a measurement with respect to a response to that request. Several measures of access quality are described above with reference to FIG. 1.

In one embodiment, as shown in the exemplary survey code of Appendix I, an HTTP request for a test resource at the selected infrastructure is issued by the survey code. A timer is also set, so as to measure the time delay between issuing the request and receiving the test resource. In further embodiments the survey code may be configured, alternatively or additionally, to issue resource requests by means of other web protocols, including protocols for accessing real-time services and for multimedia.

As shown in line 15 of the exemplary survey code in the Appendix, a randomly generated resource parameter may also be added to the request. The random variable is added so that the requested resource is not provided from a browser cache, or ISP cache server, other cache server in the network, but rather from the selected infrastructure itself.

A test resource such as a JavaScript code that is dynamic executable code may be advantageous, in that the test resource itself can turn off a timer as soon as the test resource is received and executed (line 3 of the exemplary test resource code in the Appendix). Consequently, the survey code need not wait until a resource receipt notification is provided by the web browser. Regardless of the type of test resource, the survey code generally maintains a timer to test availability, which "times out" when a response is not received within a certain period of time.

As described above, other types of access quality measures may be made, some of which may be more appropriate for different types of test resource. The survey code may make multiple measurements, one after the other, or in parallel.

Multiple test resources may be maintained on infrastructures to be surveyed. Among these resources, some may be identical, thereby permitting a comparison of access quality between infrastructures.

At a step 208, the survey code generates an indicator based on the measured access quality. The indicator may be generated as an integer, such as a flag indicating availability or a time delay, which may be in units such as thousandths or ten thousandths of a second. The indicator may also be rounded to a lower degree of accuracy, such as the nearest hundredth of a second, such that a delay of 0.2314 seconds would provide an indicator of 2300, rather than 2314. Averaging allows DNS queries to be resolved by the resolver from a resolver cache, as described further hereinbelow.

At a step 210, the survey code generates a pseudo-hostname, which includes a key string and a domain name. The key string includes at least an indicator of access quality. The key string may also include additional parameters related to the measured access quality, such as the type of access quality measured, and the names of the resource, of the infrastructure, and of the web portal. The key string is then added to the domain name.

At a step 212, the survey code executes an instruction to access a resource, the address of the resource being the pseudo-hostname. An example of such a instruction is shown in lines 9-11 of the exemplary test resource code in the Appendix. For an infrastructure named pub-infra0, and an indicator of access quality of 2314, the generated instruction is:

<script src="http://rtt.2314.pub-infra0.aqm.net"> </script>

The instruction causes the web client to generate a DNS query, so that, in effect, the DNS query is initiated by the instruction. In the given example, the resource is specified as an Internet address, that is, a pseudo-hostname. The resource specified in the instruction may also be specified with a file name.

The DNS query is received by the resolver, which then either resolves the pseudo-hostname from resolver cache or forwards the query to AQM 22. Generally, the resolver caches pseudo-hostnames for a Time-to-Live (TTL), which is a time period set by a DNS response from the AQM. When access quality from a given client region is relatively constant, many DNS queries will not reach the AQM, being resolved in resolver cache. Such operation is especially cost-effective when the AQM provides access quality data to applications that may require notification only when access quality changes, including applications such as performance monitoring and access routing. Rounding of indicators, as described above, increases the range over which access quality may be considered unchanged. It is therefore to be understood that the load on the AQM may be controlled both by the TTL setting and by the degree of rounding performed on the access quality indicator.

At a step 214, the AQM receives and processes the DNS query, an operation that includes steps 216-220.

The AQM first determines that the DNS request includes a pseudo-hostname. The survey code may be configured to generate multiple formats of pseudo-hostnames, which may be varied over time for security reasons. At a step 216, the AQM extracts the access quality indicator from the key string of the pseudo-hostname, as well as additional key string parameters. At a step 218, the AQM may then provide a DNS response to the resolver. In some embodiments, the AQM may send as a DNS response a resolution to the web client itself, with the local IP address of 127.0.0.1. The local resolution may generate an error message at the web page, an error message that is generally ignored. Alternatively, the DNS response may include a resolution to an actual web server, configured to respond with an actual resource, that is, a resource that is actually accessible. The instruction executed by the survey code may also be configured to include the name of an actual resource, which, if received may also be ignored by the web page.

After acquiring the access quality indicator, the AQM may at a step 220 generate a profile of access quality. A profile is a data value or data stream that may be provided to DNS Application Server 22 or to other requesters of access quality data. Some requesters, such as resource providers or CDN providers, may apply access quality data for billing purposes or for confirming or maintaining Quality of Service (QoS) commitments.

In some embodiments, a profile is specific to a given infrastructure. Alternatively or additionally a profile may be based on a difference in access quality between two or more infrastructures. A profile may also be specific to a client region, that is, to a given network, ISP, or geographic region.

A profile may also be generated by applying additional functions to a series of access quality indicators. For example, the profile may be a time-dependent, moving average of access quality, the moving average serving to filter out spurious measurements. The moving average may also be time-weighted, such that more recent results (i.e., access quality indicators) have a greater weight in the calculated average.

At a step 222, the AQM may convey a profile to the DNS Application Server or to other requesters. Alternatively or additionally, the AQM may apply the access quality profile to perform functions of the DNS Application Server. In particular, the AQM may determine a route by which a web client in a specific client region may access a resource by determining a preferred infrastructure for that access, the preferred infrastructure being selected based on one or more profiles of access quality.

It is to be understood that the embodiments described hereinabove are cited by way of example, and that the scope of the present invention includes both combinations and subcombinations of the various features described hereinabove, as well as variations and modifications thereof which would occur to persons skilled in the art upon reading the foregoing description and which are not disclosed in the prior art.

APPENDIX

Exemplary Survey Code and Test Resource

Survey Code

```
1   <script>
2   // Survey.js
3   // Set array of infrastructures to be surveyed
4   cdx_uu = new Array( );
5   cdx_uu[0] = "http://infra0.com/cdntest.js?pub-infra0";
6   cdx_uu[1] = "http://infras1.com/cdntest.js?pub-infra1";
7   cdx_uu[2] = "http://infras2.com/cdntest.js?pub-infra2";
8   // Randomly select one infrastructure to survey
9   cdx_y =
        cdx_uu[Math.floor(Math.random( )*cdx_uu.length)].split(
        "?" );
10  cdx_u = cdx_y[0]
11  cdx_n = cdx_y[1];
12  // Generate request for test resource
13  // (append random value to pass browser cache)
14  document.write("<script " );
15  document.write("src='" + cdx_u + "?" + Math.random( ) +
        "'>");
16  document.write("<\/script>")
17  // Start timer
18  var cdx_s = new Date( ).getTime( );
19  </script>
```

Test Resource (Javascript Code Example)

```
1   // cdntest.js
2   // Stop timer
3   var cdx_e = new Date( ).getTime( );
4   // Round results
5   var cdx_d = Math.round((cdx_e – cdx_s)/10) * 10;
6   // Create pseudo-hostname including delay time and
        infrastructure name
7   var cdx_u = "http://rtt." + cdx_d + "." + cdx_n +
        ".aqm.net";
8   //Generate instruction to initiate DNS query
9   document.write("<script" );
10  document.write("src='" + cdx_u + "'");
11  document.write("><\/script>");
```

What is claimed is:

1. A method for surveying Internet access quality, comprising:
   receiving at a DNS nameserver a DNS query for the resolution of a pseudo-hostname, wherein the pseudo-hostname is a fully qualified domain name (FQDN) that comprises an indicator of an access quality measurement and a parameter identifying an infrastructure associated with the access quality measurement;
   extracting, from the pseudo-hostname, data including the indicator of the access quality measurement and the parameter identifying the infrastructure associated with the access quality measurement; and
   generating an access quality profile using the extracted data.

2. The method of claim 1, further comprising:
   conveying the access quality profile to a requester.

3. The method of claim 2, further comprising determining a preferred Internet access route responsively to the profile.

4. The method of claim 3, wherein determining a preferred Internet access route comprises determining an infrastructure at which a web client accesses a resource.

5. The method of claim 1, wherein the access quality profile is specific to an infrastructure.

6. The method of claim 1, wherein the access quality profile is specific to a client region.

7. The method of claim 1, wherein the indicator is a first indicator, and wherein generating an access quality profile comprises:
   receiving at the nameserver one or more additional DNS queries providing one or more additional respective indicators of access quality measurements; and
   calculating an average of the first indicator and the one or more additional indicators.

8. The method of claim 1, wherein the indicator is a first indicator, and wherein generating an access quality profile comprises:
   receiving at the nameserver one or more additional DNS queries providing one or more additional respective indicators of access quality measurements; and
   calculating a difference of the first indicator and the one or more additional indicators.

9. The method of claim 1, wherein the indicator is a first indicator, and wherein generating an access quality profile comprises:
   receiving at the nameserver one or more additional DNS queries providing one or more additional respective indicators of access quality measurements;
   measuring times preceding receipt of the first DNS query and each of the one or more additional DNS; and
   calculating a time-weighted average of the first indicator and the one or more additional indicators.

10. The method of claim 1, wherein the type of the access quality indicated is one of a set of access quality types including: a round trip time of Internet communications, a connection delay time, a transmission speed, a variability of transmission speed, a communications error rate, and an availability of a resource.

11. The method of claim 1, wherein receipt of the DNS query is an indication that access quality has changed.

12. A method for surveying Internet access quality, comprising:
   transmitting a code to a web client, wherein the code is configured:
      to execute at the web client to determine an indicator of measured access quality, the determining comprising:
         issuing a request for a resource; and
         obtaining the measured access quality from a time delay associated with the request;
      to create a pseudo-hostname that is a fully qualified domain name (FQDN) which combines the indicator of measured access quality and a domain name; and
      to initiate a DNS query to resolve the pseudo-hostname.

13. The method of claim 12, wherein the obtaining comprises measuring a type of access quality with respect to a response.

14. The method of claim 13, wherein the type of access quality measured is one of a set of types of access quality including: a round trip time of Internet communication, a connection delay time, a transmission speed, or a variability of transmission.

15. The method of claim 12, wherein the resource is accessed from a cache at an infrastructure and wherein the code is configured to issue the request for the resource by issuing two requests for the resource and adding a randomly generated resource parameter to each request.

16. The method of claim 12, wherein the resource is a first resource and the code is configured to initiate the DNS query by requesting a second resource at an address specified by the pseudo-hostname.

17. The method of claim 12, wherein the web client is a web browser and wherein the code is configured to run within the web browser in a manner that is transparent to a user of the web browser.

18. The method of claim 12, wherein the code is configured to round the access quality measurement to a lower precision such that the DNS request to resolve the pseudo-hostname may be resolved by a resolver.

19. A method for surveying Internet access quality, comprising:
   issuing a request for a resource;
   obtaining a response or a time-out for the request;
   generating an access quality measurement based on the response or on the time-out;
   creating a pseudo-hostname, which is a fully qualified domain name (FQDN) that encodes the access quality measurement; and
   initiating a DNS query to resolve the pseudo-hostname.

20. A system for surveying Internet access quality, comprising:
   a nameserver implemented on one or more first computer processors with first memory coupled thereto, the nameserver registered to be authoritative for a domain name and configured to receive a DNS query to resolve a pseudo-hostname and to extract from the pseudo-hostname an indicator of an access quality measurement; and
   a web portal implemented on one or more second computer processors with second memory coupled thereto, the web portal configured to transmit a data survey code to a web browser, wherein the data survey code is configured to access a resource, to determine the access quality measurement responsively to the resource access, to generate the pseudo-hostname, which is a fully qualified domain name that includes the indicator of the access quality measurement and the domain name, and to initiate the DNS query;
   wherein the data survey code is configured to run within the web browser in a manner that is transparent to a user of the web browser.

21. The system of claim 20, wherein the DNS query is a first DNS query, and wherein load on the nameserver is reduced by resolution of a second DNS query for the pseudo-hostname, including the same indicator of the access quality measurement as in the first DNS query, in a resolver cache.

* * * * *